PHOTO-ELECTRIC SENSING CIRCUIT

Filed Oct. 27, 1961

INVENTOR.
JOSEPH G.A. VAN REYMERSDAL
BY
Robert D. Sanborn
ATTORNEY

United States Patent Office 3,189,745
Patented June 15, 1965

3,189,745
PHOTO-ELECTRIC SENSING CIRCUIT

Joseph G. A. Van Reymersdal, Fairless Hills, Pa., assignor, by mesne assignments, to Philco Corporation, Philadelphia, Pa., a corporation of Delaware

Filed Oct. 27, 1961, Ser. No. 148,136
7 Claims. (Cl. 250—214)

The present invention relates to photo-electric sensing systems and more particularly to photo-electric punched card readers or the like.

Computers and other data processing systems frequently make use of perforated cards for data storage. Data is stored on the cards by punching or perforating the cards at selected information locations in accordance with a preselected code. A typical data storage card now in widespread use provides 960 possible information locations arranged in twelve rows with eighty information locations in each row. Frequently the data storage cards will contain additional information printed or stamped thereon in ink in a conventional fashion. Some of the printed information may occupy one or more of the possible information or perforation locations.

In high speed data processing systems it is necessary that the punched cards be scanned at a very rapid rate, for example at the rate of a thousand or more cards per minute. If parallel transfer of data between registers is employed in the data processing system it is highly desirable that the cards be read row by row with all information locations of a row being scanned or read at the same instant.

The high speed at which the cards must be scanned makes non-contacting readers, such as photo-electric card readers, preferable to any form of reader which requires any contact with the card other than the card feed mechanism. However, photo-electric card readers are subject to certain limitations. The cards to be read are generally not opaque. Therefore there is a certain amount of light which passes through unperforated portions of the card. The ratio of the light passing through perforations in the card to the light passing through an unperforated portion of the card may be as low as three to one. Printing on the card may vary the amount of light passing through unperforated portions of the card. Photodiodes are commonly employed to sense the light passing through a hole in the card. However the response of two photodiodes of the same type to the same light stimulus may vary by a factor of up to 10. Furthermore over a period of time the response to any photodiode may vary more than three to one due to aging or other effects. If a row of photodiodes corresponding in number to the number of possible information or perforation locations in one row is employed as the scanning device, any skew or misalignment of the card as it passes over the row of photodiodes reduces the interval during which all of the information locations of a row are scanned simultaneously. For these and other reasons it is impossible to employ simple threshold circuits responsive to the scanning photodiodes to indicate the presence or absence of a perforation in the area being scanned by the diode. While various means have been proposed to overcome the limitations of simple photodiode sensing circuits such means have been generally complex and expensive.

Therefore it is an object of the present invention to provide an improved means for photo-electrically scanning an information record or the like.

A further object of the invention is to provide a novel photodiode circuit which minimizes the effect of variations in the individual diode characteristics.

An additional object of the invention is to provide a photodiode circuit which will provide a predetermined response at a selected illumination level despite certain changes in the diode characteristics.

In general these and other objects of the invention are realized by providing a circuit in which the photodiode, when illuminated, establishes the level at which the circuit will switch from an operated to an unoperated state, this level being determined mainly by the response of the photodiode to the incident illumination.

For a better understanding of the present invention together with other and further objects thereof, reference should now be made to the following detailed description which is to be read in conjunction with the accompanying drawings in which.

Figure 1:
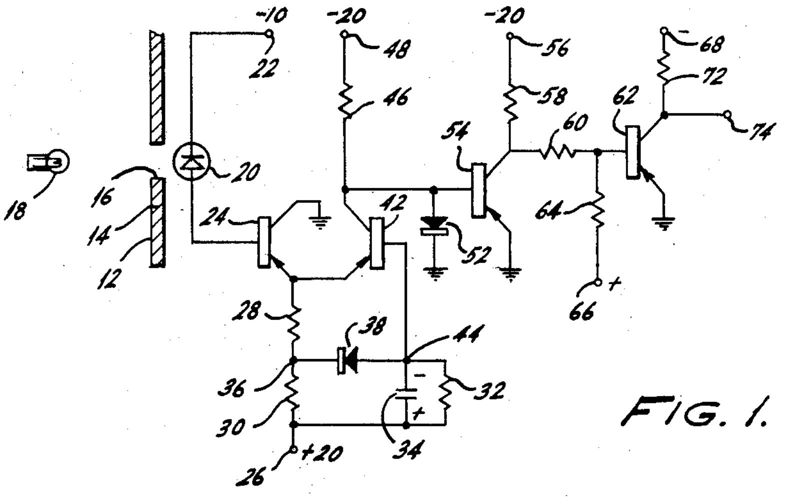
FIGURE 1 is a circuit diagram of one preferred embodiment of the invention.
Figure 2:
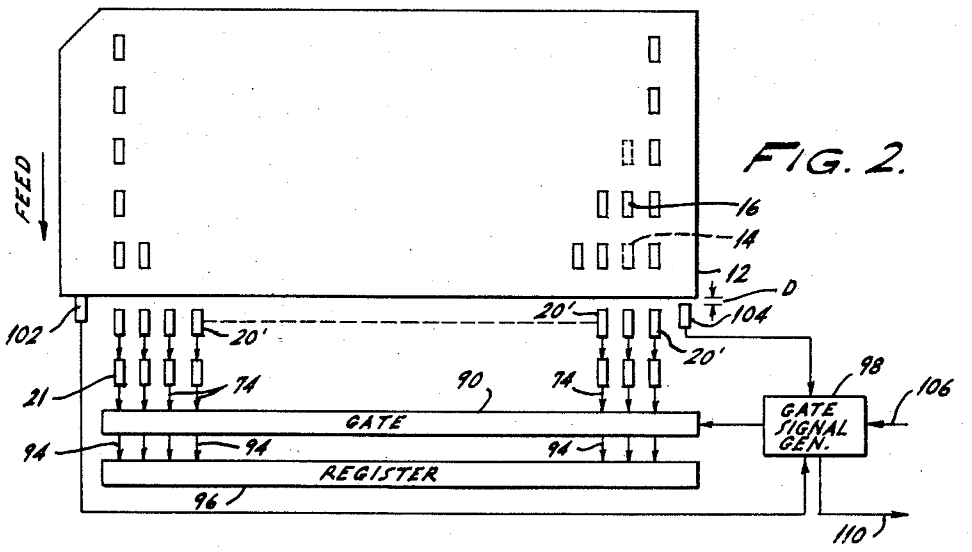
FIGURE 2 is a diagrammatic showing of an information record card and a portion of the means for scanning the information record card.

In FIGURE 1 the record card to be scanned is diagrammatically shown in cross-section at 12. A plan view of card 12 is shown in FIGURE 2. Information may be recorded or stored on the card 12 in binary form by representing the binary bit 0 by an unperforated portion 14 of card 12 and the binary bit 1 by a perforation such as the one shown at 16. The location of unperforated area 14 is represented by the broken line 14 in FIG. 2. Perforation 16 is represented by the solid line 16 in FIG 2. A light source shown diagrammatically at 18 in FIG. 1 is provided for illuminating one or more information locations in a row. A photodiode 20 is provided for each information location in the row. Only one photodiode 20 and the circuit associated therewith is shown in FIGURE 1, since the circuits associated with other information locations in a row may be exact duplicates of the circuit for the one information location shown. Each block 20' in FIG. 2 represents schematically one photodiode corresponding to the photodiode 20 of FIG. 1. In FIG. 2 light source 18 is not shown and card 12 is shown upwardly displaced from the position shown in FIG. 1 in order that the photodiodes 20' may be seen. Each block 21 in FIG. 2 represents a circuit like that shown to the right of photodiode 20 in FIG. 1.

Returning to FIG. 1 it will be seen that one terminal of photodiode 20 is connected to a source of negative potential as represented by terminal 22. The other terminal of photodiode 20 is connected directly to the base of transistor 24. The collector of transistor 24 is connected directly to ground. The emitter of transistor 24 is returned to a source of positive potential, represented by terminal 26, through resistors 28 and 30 to form a type of emitter follower stage. In a typical embodiment of the invention resistors 28 and 30 may have resistances of 1.5K ohms and 3.4K ohms respectively. Terminal 26 may be maintained at a potential of the order of +20 volts.

A resistor 32 is connected in shunt with a capacitor 34. For reasons which will appear later the time constant of the circuit comprising resistor 32 and capacitor 34 is made long compared to the transit time of a single card past photodiode 20. One terminal of capacitor 34 is connected to terminal 26. The other terminal of capacitor 34 is connected to the junction 36 of resistors 28 and 30 by way of unilateral conducting device 38. Unilateral conducting device 38 may be either a solid state diode or a transistor connected as a diode.

The emitter of transistor 24 is connected directly to the emitter of a second transistor 42. The base of transistor 42 is connected to the junction 44 of capacitor 34 and diode 38. The collector of transistor 42 is connected through a suitable collector load resistor 46 to a source of negative potential represented by terminal 48. A diode 52 is connected between the collector of transistor 42 and ground in a manner such as to prevent the collector of transistor 42 from going positive with respect to ground.

In a typical embodiment of the invention capacitor 34 may have the value of 47 microfarads, resistor 32 a resistance of 56K ohms and resistor 46 a resistance of 390K ohms. Terminal 48 may be maintained at a potential of the order of −20 volts.

The collector of transistor 42 is coupled directly to the base of transistor 54. The emitter of transistor 54 is connected to ground and the collector is returned to a source of collector supply potential represented by terminal 56 through the collector load resistor 58. Thus transistor 54 and resistor 58 together form a conventional common emitter amplifier stage. The collector of transistor 54 is connected through resistor 60 to the base of a transistor 62. A resistor 64 is connected from the base of transistor 62 to a source of base bias potential represented by terminal 66. Resistors 60 and 64 provide a suitable biasing network for the base of transistor 62. The emitter of transistor 62 is connected to ground and the collector is returned to a source of collector potential, represented by terminal 68, through the collector load resistor 72. The output signal of the circuit of FIG. 1 is present at terminal 74 which is connected to the collector of transistor 62. Typical characteristics for resistors 58, 60, 64 and 72 are 51K ohms, 6.8K ohms, 270K ohms and 6.8K ohms, respectively. Terminals 48, 56 and 68 may be connected together and supplied with a potential of the order of −20 volts. Terminal 66 may be supplied with a potential of the order of +20 volts.

The circuit shown in FIGURE 1 operates in the following manner. Each photodiode 20′ of FIG. 1 is responsive only to the light arriving from an area corresponding generally in size to one information location on card 12. The unperforated portion of card 12, for example portion 14, may transmit of the order of 25% of the light which falls on photodiode 20 in the absence of a card 12. The light received by photodiode 20 with a perforation 16 in register between light source 18 and diode 20 may be of the order of 75% of the light received by photodiode 20 with no card 12 present. In one typical embodiment of the invention it was found that with no card 12 interposed between light source 18 and photodiode 20 the currents through the eighty photodiodes 20, all of which were of the same type, ranged from 50 microamps to 700 microamps depending on the characteristics of the individual diodes. As mentioned above this variation is due to unavoidable variations in the characteristics of individual photodiodes. The amplitude of the current in photodiode 20 when an unperforated portion of the card 12 is interposed between source 18 and photodiode 20 was found to range between approximately 10 microamps for a relatively weak photodiode to approximately 100 microamps for a more active photodiode. Thus it will be seen that the "no light" current of an active photodiode may actually exceed the current of a less active photodiode when illuminated by the light passing through a perforation.

In the absence of a card between diode 20 and light source 18 transistor 24 is biased into conduction by an amount which is a function of the characteristics of photodiode 20. Current will flow from source represented by terminal 26 through capacitor 34, diode 38, resistor 28 and transistor 24 to charge capacitor 34. The charging time constant of this circuit is made relatively short so that capacitor 34 is fully charged in the interval between successive cards to be read. The ultimate potential on capacitor 34 is a function of the impedance of the illuminated photodiode 20 and will be greater for a more active diode 20 than it will for a less active diode. The potential appearing across capacitor 34 will be equal to the voltage of the collector of transistor 24 divided by the ratio of the voltage divider formed by resistors 28, 30 and 32.

If the edge of card 12 is now interposed between light source 18 and photodiode 20 so that the light falling on photodiode 20 is materially reduced, say to a value of 25% of its former level, the current in photodiode 20 will decrease and the potential at junction point 36 and at the emitter of transistor 24 will tend to rise towards the positive potential impressed at terminal 26. This causes junction point 36 to become more positive than terminal 44. Conduction through diode 38 ceases and the potential on capacitor 34 is fixed except for the leakage through the high resistance bleeder 32. This also fixes the potential at the base of transistor 42.

As the emitter of transistor 24 becomes more positive, the emitter of transistor 42 will also become more positive owing to its direct connection to the emitter of transistor 24. As the potential of the emitter of transistor 42 rises a point is reached at which the emitter of transistor 42 which was initially less positive than the base, i.e. negative with respect to the base, is more positive than the base. At this point transistor 42 will be turned on. This causes the potential at the collector of transistor 42 to become less negative owing to the current flow through resistor 46.

The less negative potential at the collector of transistor 42 tends to turn transistor 54 off. The resulting change in the collector potential of transistor 54 tends to turn transistor 62 on. Therefore with the card 12 interposed between source 18 and photodiode 20, terminal 74 will be at a potential closer to ground than that represented by terminal 68. That is, it will be at low negative potential. The collector of transistor 42 is prevented from going positive with respect to ground by the diode 52. This, in turn, prevents the base-collector diode of transistor 42 from becoming forward biased and hence prevents an increase of the effective time constant of the circuit due to storage effects in transistor 42.

If the card 12 is now moved so that a more opaque area is interposed between light source 18 and photodiode 20, for example an area having data printed or stamped thereon, there will be no change in the output level at terminal 74 since transistor 42 turns transistor 54 completely off when a normal unperforated area is interposed between source 18 and photodiode 20. It should be remembered that each of the diodes 20′ of FIG. 2 will turn its respective transistor 54 completely off regardless of the sensitivity of that particular photodiode 20′ since each photodiode 20′ sets the bias on the base of its associated transistor 42 in accordance with the sensitivity of the photodiode 20′.

If card 12 is again moved so that a perforation, such as perforation 16 of FIGURE 1, is aligned with source 18 and photodiode 20, the impedance of photodiode 20 will be decreased, the base current of transistor 24 will increase and the potential at the emitters of transistors 42 and 24 will become less positive. As a result of this change in potential at the emitter of transistor 42 this transistor will be turned off, transistor 54 will be turned on and transistor 62 will be turned off. This will cause terminal 74 to rise to approximately the potential of terminal 68.

In preferred forms of photo-electric card readers the card 12 will be passed in one continuous motion between source 18 and the photodiodes 20 by suitable card feeder means (not shown). Thus it will be seen that the passage of a perforation such as perforation 16 by photodiode 20 will result in a negative pulse of predetermined amplitude to appear at terminal 74.

Figure 3:
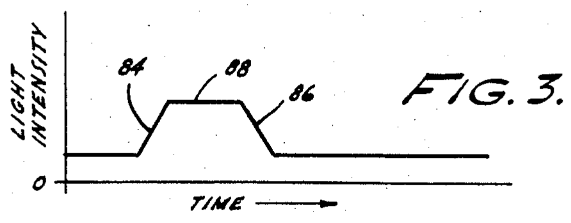
FIGURE 3 is a waveform which illustrates the variation in the light falling on one of the perforation sensing elements due to the passage of a perforation.

It can be shown that the light falling on photodiode 18 as the result of the continuous passage of a perforation 16 between photodiode 20 and source 18 undergoes a variation such as that shown in FIGURE 3. The rising portion 84 of the waveform of FIGURE 3 results from the gradual uncovering of the photodiode as the perforation 16 moves into register therewith. The downward sloping portion 86 results from the partial blocking of the light to the photodiode 20 as the perforation 16 moves out of register therewith. The length of the substantially flat portion 88 will depend upon the relative length of the perforation 16 and the length of the active region of photodiode 20 measured in the direction of motion of card 12. It can be shown that transistor 42 is turned off at a substantially the same light level for each of the photodiodes 20' of FIG. 2 since the point at which this transistor is turned off in each of the circuits 21 is determined by the potential appearing across its associated capacitor 34. Similarly the transistor 42 is turned on at substantially the same light level for each of the circuits for the same reason. Thus the width of the output pulse at the terminal 74 is made less dependent on the sensitivity of the photodiode 20 than it would be in a simple threshold circuit. This standardization of the output pulse width is a distinct advantage in minimizing the possibility of loss of data from a given information location of the card due to any skew or misalignment of the card as it is fed past the row of photodiodes 20'.

The means for feeding the cards 12 past the photodiode 20' and the means for transferring data from the various output connections 74 lie outside the scope of the present invention. However, by way of illustration only the feeding of the cards may be accomplished by means of rotating rubber rollers which engage each card in turn and feed these cards past the photodiodes 20'. An example of a card feed mechanism of this type is shown in U.S. Patent No. 3,001,789. Further, by way of illustration FIGURE 2 shows a gate system 90 which includes a plurality of individual gate circuits equal in number to the number of photodiodes 20'. Each individual gate circuit in the gate system 90 connects one output 74 to an input 94 of a multi-digit storage register 96. Individual gates within gate system 90 are controlled by a data transfer signal supplied by gate signal generator 98 to gate system 90. The production of the data transfer signal, which may be a simple pulse signal, is controlled at least in part by two edge sensing means 102 and 104. Sensing means 102 and 104 may be photodiode sensing circuits similar to the circuits shown in FIGURE 1. Additional control signals may be supplied to gate signal generator 98 if necessary. Input 106 represents schematically an input for receiving such external control signals. Sensing means 102 and 104 each produce a signal at the instant the edge of the card 12 passes thereover. If the card 12 is perfectly aligned with the row of photodiodes 20' the signals will be generated by sensing means 102 and 104 at the same time. If the card is slightly skewed as shown at D in FIGURE 2 there will be a slight time difference between the generation of a signal by sensing means 102 and sensing means 104. Circuit 98 includes means responsive to the signal supplied by sensing means 102 and 104 for generating a data transfer signal if and only if the time difference between the generation of the two signals by sensing means 102 and 104 lies below a selected maximum value. If the time difference between the signals provided by sensing means 102 and 104 exceeds the preselected value, an output signal may be provided at lead 110 to indicate that card 12 is skewed to such an extent that the rows of information locations cannot be scanned properly by photodiodes 20'. The signal at output lead 110 may be employed for ejecting the skewed card 12 for later reading or for the taking of any other suitable action by the card reading system.

While the circuit of FIGURE 1 has been described as a transistor circuit, vacuum tubes or other equivalent devices may be substituted therefor. In addition, one or both of the amplifier stages including transistors 54 and 62 may be modified or omitted to provide an output signal in a desired form. Also the circuit shown in FIG. 1 may be employed in readers for printed and punched tape and in other applications as well provided that the photodiode 20 is illuminated at periodic intervals of sufficient duration to maintain on capacitor 34 a charge determined primarily by the characteristics of photodiode 20. Therefore while there has been described what is at present considered to be a preferred embodiment of the invention it will be apparent that various modifications and other embodiments thereof will occur to those skilled in the art within the scope of the invention. Accordingly I desire the scope of the invention to be limited only by the appended claims.

I claim:

1. A photo-electric sensing circuit comprising a first amplifier stage including an input terminal and a load impedance, a photodiode coupled to said input terminal for controlling the magnitude of the signal appearing across said load impedance as a function of the intensity of the illumination of said photodiode, signal storage means coupled to said load impedance and adapted to provide and maintain an output signal having a magnitude substantially proportional to a predetermined fraction of the magnitude of the signal appearing across said load impedance in response to one extreme of illumination of said photodiode, a second amplifier stage, means coupling said load impedance and said storage means to the input of said second amplifier stage to provide a net input signal to said second amplifier stage which is proportional to the difference between the instantaneous signal appearing across said load impedance and the signal provided by said signal storage means, and means for deriving an output signal from said second amplifier stage.

2. A photo-electric sensing circuit comprising a first transistor emitter-follower stage including an input terminal and a load impedance, a photodiode coupled to said input terminal for controlling the magnitude of the signal appearing across said load impedance as a function of the intensity of the illumination of said photodiode, storage signal means coupled to said load impedance and adapted to provide and maintain an output signal having a magnitude substantially proportional to a predetermined fraction of the magnitude of the signal appearing across said load impedance in response to maximum illumination of said photodiode, a second amplifier stage, means coupling said load impedance and said storage means to the input of said second amplifier stage to provide a net input signal to said second amplifier stage which is proportional to the difference between the instantaneous signal appearing across said load impedance and the signal provided by said signal storage means, and means for deriving an output signal from said second amplifier stage.

3. A photo-electric sensing circuit comprising a first transistor emitter-follower stage including a first transistor having an emitter, a collector and a base, and a load impedance coupled to said emitter; a photodiode coupled between said base and a point of fixed reference potential; signal storage means coupled to said load impedance and adapted to provide and maintain an output signal having magnitude substantially proportional to a predetermined fraction of the maximum signal occurring across said load impedance; a second transistor having a base, an emitter and a collector; a second load impedance connected between said collector of said second transistor and a point of fixed bias potential; means connecting the emitter of said second transistor to the emitter of said first transistor; means coupling the base of said second transistor to said signal storage means; and means for deriving an output signal from the collector circuit of said second transistor.

4. A photo-electric sensing circuit comprising a first transistor emitter-follower stage including a first transistor having an emitter, a collector and a base, and a load impedance coupled to said emitter; a photodiode coupled between said base and a point of fixed reference potential; a unilateral conductive device and a capacitor connected in series circuit; said series circuit being connected in shunt with a portion of said load impedance remote from said emitter; a second transistor having a base, an emitter and a collector; a second load impedance connected between said collector of said second transistor and a point of fixed bias potential; means connecting the emitter of said second transistor to the emitter of said first transistor; means coupling the base of said second transistor to a selected terminal of said capacitor; and means for deriving an output signal of the collector circuit of said second transistor.

5. A photo-electric information sensing system comprising a source of illumination, a photodiode positioned to be illuminated by said source of illumination, an information containing record interposable between said source of illumination and said photodiode, said information containing record being adapted to vary the illumination received by said photodiode in accordance with the information to be read, a first transistor emitter-follower stage including a first transistor having an emitter, a collector and a base, and a load impedance coupled to said emitter; said photodiode being coupled between said base and a point of fixed reference potential, a unilateral conductive device and a capacitor connected in series circuit, said series circuit being connected in shunt with a portion of said load impedance remote from said emitter, a second transistor having a base, an emitter and a collector, a second load impedance connected between said collector of said second transistor and a point of fixed bias potential, means connecting the emitter of said second transistor to the emitter of said first transistor, means coupling the base of said second transistor to a selected terminal of said capacitor, and means for deriving an output signal from the collector circuit of said second transistor.

6. A photo-electric sensing circuit comprising first and second amplifier elements, each of said amplifier elements having first and second electrodes defining a main signal path and a control electrode which together with said first electrode controls the magnitude of the current flow in said main signal path, said first electrodes of said two amplifier elements being connected together, said second electrode of said first amplifier element being connected to a point of fixed reference potential, a load impedance having a first terminal connected to said first electrodes, a second terminal connected to a first source of first bias potential, and a third terminal intermediate said first and second terminals, signal storage means coupled to said second and third terminals of said load impedance and adapted to provide and maintain a signal output proportional to the potential appearing between said second and third terminals when said first amplifier means is in a predetermined state of conduction, a photodiode having one terminal thereof coupled to said control electrode of said first amplifier element and a second terminal connected to a second source of bias potential different from said first source of bias potential, a second load impedance coupled to said second electrode of said second amplifier element, means coupling said signal storage means to said control electrode of said second amplifier element, and means for deriving an output signal from said second load impedance.

7. A photo-electric sensing circuit comprising first and second transistors each having a base, an emitter and a collector; said emitters of said two transistors being connected together; means connecting said collector of said first transistor to a point of fixed reference potential; a load impedance having a first terminal connected to said joined emitters, a second terminal connected to a source of fixed bias potential other than said reference potential, and a third terminal intermediate said first and second terminals; a storage capacitor; a unilateral conductive device coupled between said third terminal of said load impedance and a first terminal of said capacitor; means coupling a second terminal of said capacitor to said second terminal of said load impedance; a bleeder resistance connected in shunt with said storage capacitor; a photodiode coupled between said base of said first transistor and a second source of bias potential different from said first source; a second load impedance coupled to said collector of said second transistor; means coupling said first terminal of said storage capacitor to said base of said second transistor and means for deriving an output signal from said second load impedance.

References Cited by the Examiner

UNITED STATES PATENTS

| | | | |
|---|---|---|---|
| 2,890,353 | 6/59 | Van Overbeek et al. | 250—214 X |
| 2,924,724 | 2/60 | Booker | 307—88.5 |
| 2,971,134 | 2/61 | Cockrell | 307—88.5 X |
| 3,013,159 | 12/61 | De Sautels | 307—88.5 X |
| 3,060,329 | 10/62 | Harrison et al. | 307—88.5 X |

RALPH G. NILSON, *Primary Examiner.*

WALTER STOLWEIN, *Examiner.*